INVENTOR.
E. A. MALICK
BY Hudson & Young
ATTORNEYS

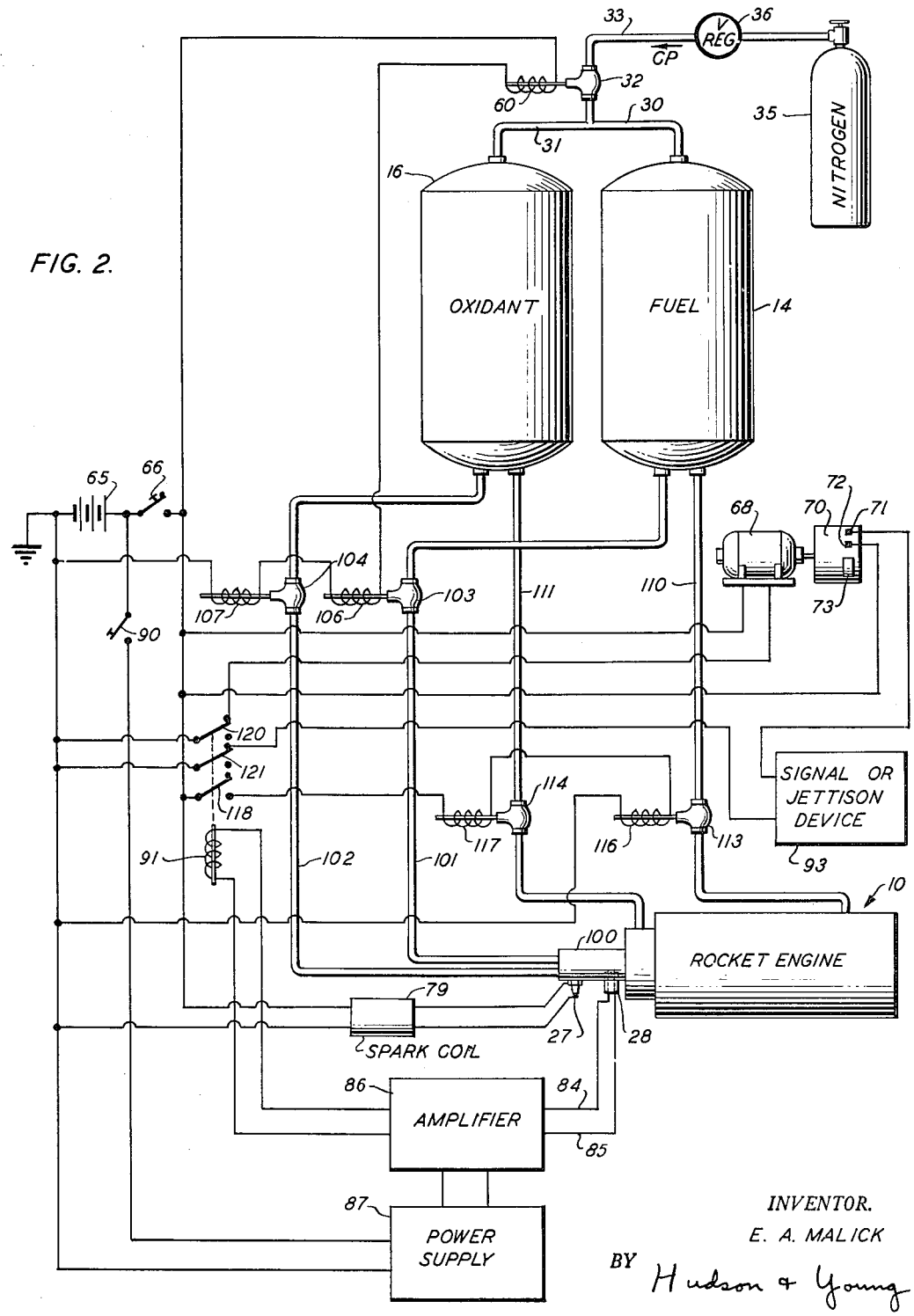

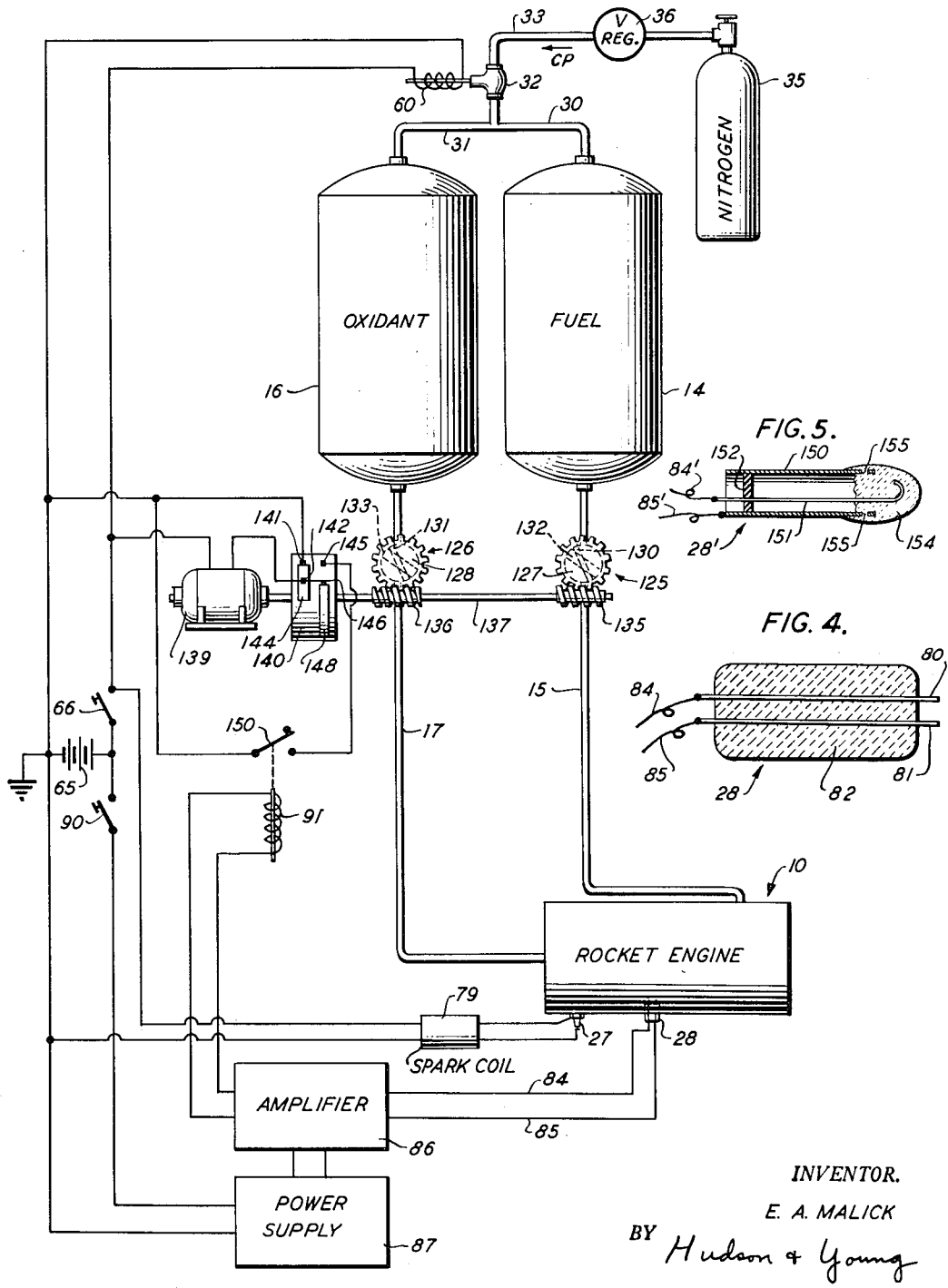

United States Patent Office 2,743,577
Patented May 1, 1956

2,743,577

ROCKET ENGINE CONTROL

Emil A. Malick, Bartlesville, Okla., assignor to Phillips Petroleum Company, a corporation of Delaware Application June 2, 1952, Serial No. 291,205

17 Claims. (Cl. 60—39.09)

This invention relates to rocket engines. In one specific aspect it relates to mechanism for starting reaction or rocket engines by regulating the flow of fuel and/or oxidant supplied to the combustion chamber. In another specific aspect it relates to mechanism for preventing hazardous explosions in rockets that fail to ignite properly.

In operating a rocket engine it is essential that propellants not be fed into the combustion chamber at such times as the burner is not functioning properly. This is particularly true during the starting of the engine because an accumulation of unburned fuel may take place within the combustion chamber which can cause a violent explosion once ignition does take place. In military operations wherein it is contemplated that rockets be launched from aircraft, it is of course of utmost importance to prevent such an accumulation of unburned fuel and the resultant explosion hazard.

In accordance with the present invention a rocket control system is provided whereby dangerous accumulations of unburned fuel are avoided either by interrupting the flow of propellants into the combustion chamber or by restricting the flow until proper combustion takes place. Such control is effected by the use of a sensitive flame detecting element positioned within the combustion chamber, which element is capable of providing almost an instantaneous response to the presence of flame in the region of the detecting element. An electrical output signal from this flame detecting element is employed to control the flow of propellants into the combustion chamber and also to provide a warning signal indicating failure of the rocket engine to ignite. In addition, the output signal from the flame detecting device can be employed to jettison a defective rocket from the launching aircraft.

Accordingly, it is an object of the present invention to provide means for controlling the starting of a rocket engine which prevent the dangerous accumulation of unburned fuel in the combustion chamber.

Another object is to provide improved means for regulating the flow of fuel and/or oxidant to the combustion chamber of a rocket engine.

A further object is to provide starting control mechanism for rocket engines which functions in an automatic manner.

A still further object is to provide apparatus for indicating failure of a rocket engine to operate, and means to jettison a rocket from a launching aircraft in the event of ignition failure of the rocket.

Various other objects, advantages and features of this invention will become apparent from the following detailed description taken in conjunction with the accompanying drawing in which:

Figure 2 is a schematic view of a second embodiment of the invention;

Figure 3 is a schematic view of a third embodiment of the invention;

Figure 4 illustrates a flame detecting element which can be employed in the control systems of Figures 1, 2 and 3; and Figure 5 is a second form of flame detecting element.

Figure 1:
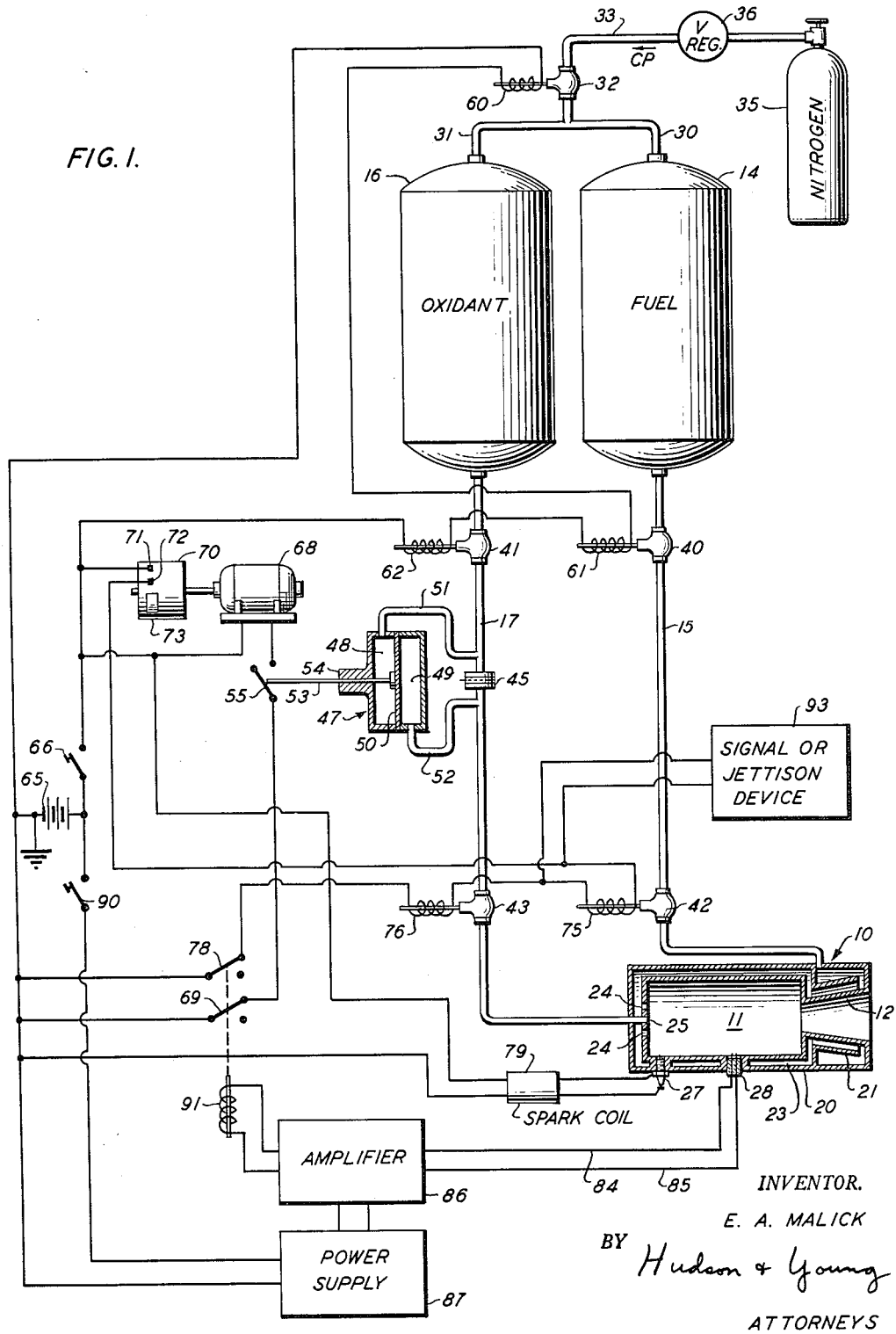
Figure 1 is a schematic view illustrating an application of the present invention to control a rocket engine.

Referring now to the drawing in detail and to Figure 1 in particular, the numeral 10 indicates one form of rocket engine to which the control system of the present invention is particularly applicable. Engine 10 is of the self-cooled or regenerative type and is provided with an inner chamber 11 in which combustion occurs. Chamber 11 communicates with an expansion nozzle 12 through which the burning gases are expelled, thereby producing the propulsive thrust. Engine 10 is supplied with a liquid fuel such as a hydrocarbon mixture from a tank 14 by a conduit 15, and with an oxidant such as liquid oxygen from a tank 16 by a conduit 17. In order to prevent overheating of combustion chamber 11 and nozzle 12 an external cooling jacket 20 and a baffle member 21 are provided about chamber 11 and nozzle 12, respectively. Both cooling jacket 20 and baffle 21 are separated from chamber 11 and nozzle 12 by a narrow annular passage 23 through which the fuel from conduit 15 passes before entering combustion chamber 11 through a series of ports such as 24. The flow of fuel through passage 23 thus performs the dual functions of cooling the combustion chamber and vaporizing the liquid fuel before said fuel enters the combustion chamber. As illustrated, the oxidant enters chamber 11 from conduit 17 through a port 25. If necessary, means can be provided to vaporize the liquid oxygen before its entry into chamber 11. In actual construction, port 25 comprises a series of annular ports; however, for purposes of simplifying the drawing only a single port has been shown. A spark plug 27 is disposed within combustion chamber 11 adjacent ports 24 and 25 in order to initiate combustion, and a flame detecting device 28 is disposed within chamber 11 to detect the presence of flame. Flame detecting element 28 is illustrated in detail in Figure 4 and is more fully described hereinafter.

The upper ends of tanks 14 and 16 are connected by respective conduits 30 and 31 to one opening of a common solenoid operated valve 32, the other opening of which is connected by a conduit 33 to a tank 35 which contains a gas such as nitrogen or helium under pressure. A constant pressure outlet valve 36 is disposed in conduit 33 such that gas from tank 35 passes into tanks 14 and 16 at a constant pressure whenever valve 32 is open. Conduits 15 and 17 contain respective first solenoid operated valves 40 and 41 which are operated in unison and second respective solenoid valves 42 and 43 which also are operated in unison. An orifice plate 45 is disposed in conduit 17 between valves 41 and 43, and a pressure responsive switch element 47 is provided adjacent orifice plate 45. Switch member 47 comprises two pressure chambers 48 and 49 separated by a flexible diaphragm 50. Chamber 48 communicates with conduit 17 on the upstream side of orifice plate 45 by a conduit 51, and chamber 49 communicates with conduit 17 on the downstream side of orifice plate 45 by a conduit 52. A rod 53 is secured at one end to diaphragm 50 and passes through a flanged end plate 54 of switch element 47. The second end of rod 53 is attached to a switch 55.

Valves 32, 40 and 41, which normally are biased in a closed position, are actuated by the passage of current through respective solenoid coils 60, 61 and 62 associated therewith. Coils 60, 61 and 62 are connected in series arrangement with a source of energizing current 65 through a switch 66. Closure of switch 66 thus serves to open simultaneously valves 32, 40 and 41, and also to apply one terminal of current source 65 to one terminal of an electric motor 68. The second terminal of motor 68 is connected to the second terminal of current source 65 through series connected switches 55 and 69. A rotatable drum 70 constructed of electrically insulating material is mounted on the drive shaft of motor 68. A pair of brushes 71 and 72 make contact with the periphery of drum 70, and a thin strip of electrically conductive material 73 is mounted on the periphery of drum 70 such that rotation of drum 70 completes contact between brushes 71 and 72 through conductive strip 73. Valves 42 and 43 are actuated by respective solenoid coils 75 and 76 which are energized from current source 65 through switch 66, brush 71, strip 73, brush 72 and a switch 78. Closure of switch 66 also completes a circuit between current source 65 and a spark coil 79 which energizes spark plug 27.

Flame detecting device 28 illustrated in Figure 4 comprises a pair of electrodes 80 and 81 spaced from one another and imbedded in a block of electrically insulating material 82. Electrodes 80 and 81 are formed of a conductive material which preferably is capable of withstanding the effects of high temperature flames. For example, these electrodes can be formed of a metal such as stainless steel. Block 82 preferably is constructed of a ceramic such as aluminum oxide which also is capable of withstanding high temperature flames. While aluminum oxide normally is considered to be an insulator, at elevated temperatures the electrical conductivity is increased somewhat. Flame detecting device 28 is based upon a recent discovery that if a pair of spaced electrodes are positioned such that at least one of the electrodes is disposed in the region of flame, alternating voltage fluctuations are generated between the two electrodes by the action of flame impinging upon at least one of the electrodes. The alternating signal thus generated is, however, of small amplitude and must be amplified before being of sufficient strength to actuate available control mechanism. By amplifying the voltage fluctuations generated between electrodes 80 and 81 whenever flame is impinging upon at least one of these electrodes a signal is obtained which is indicative of the presence of flame in combustion chamber 11. To this end electrical leads 84 and 85 connect electrodes 80 and 81 to the input terminals of an alternating current amplifier 86. Amplifier 86 can be any type of alternating current amplifier, but should be capable of passing signals from a few cycles to several kilocycles. A suitable amplifier which can be employed in this respect is described in the copending application of J. R. Parsons and M. C. Burk, Serial No. 272,146 filed February 18, 1952. It should be noted that this particular form of flame detector is in no way equivalent to the numerous ionization gaps known in the art which are operated by a flame completing a circuit path between two elements. In the present detector the flame serves to generate a fluctuating voltage.

In order to supply operating potentials for amplifier 86 a power supply circuit 87 is connected across current source 65 through a switch 90. Power supply 87 can comprise a conventional vibrator-type supply adapted to provide vacuum tube operating voltages from a source of low voltage direct current. Suitable supply circuits of this type are described in "The Radio Amateur's Handbook," The American Radio Relay League, West Hartford, Connecticut, 1949, Chapter 7. The output signal from amplifier 86, which is generated whenever flame is impinging upon detector 28, is applied to a solenoid coil 91, the armature of which is mechanically coupled to both switches 69 and 78 such as to move both switches simultaneously whenever flame is detected in chamber 11.

In operating the control circuit of the present invention switch 90 first is closed to energize power supply 87. To start engine 10, switch 66 is closed, thereby energizing solenoid coils 60, 61 and 62 to open respective valves 32, 40 and 41. This results in pressure being applied from tank 35 to both fuel tank 14 and oxidant tank 16 which forces the flow of fuel through conduit 15 and oxidant through conduit 17 into chamber 11 of engine 10. As soon as the flow through conduit 17 reaches a preselected rate as determined by the pressure differential across orifice plate 45, the difference in pressure between chambers 48 and 49 is such that flexure of diaphragm 50 in the direction of chamber 49 is sufficient to close switch 55. Closure of switch 55 results in completion of a circuit from current source 65 to motor 68 through normally closed switch 69. Motor 68 then begins to rotate and in so doing moves drum 70 such that contact strip 73 approaches brushes 71 and 72. As soon as strip 73 makes contact with both brushes 71 and 72 an electrical circuit is completed therethrough which results in the flow of current from source 65 through solenoid coils 75 and 76 and normally closed switch 78. The application of energizing current to coils 75 and 76 closes valves 42 and 43 to prevent the further flow of fuel and oxidant into chamber 11.

The operation of the control mechanism thus far described takes place in the absence of combustion occurring in chamber 11. The timing of the motor circuit is adjusted such that valves 42 and 43 are closed before a dangerous accumulation of unburned fuel can take place within chamber 11. However, in the normal course of operation, combustion will occur in chamber 11 during this predetermined time interval, thereby resulting in an electrical signal being generated by flame detecting device 28. This electrical signal, after amplification, serves to energize solenoid coil 91, thereby opening switches 69 and 78. The opening of switch 69 disconnects current source 65 from motor 68 and the opening of switch 78 disconnects current source 65 from series connected solenoid coils 75 and 76 which stops rotation of motor 68 before strip 73 completes contact between brushes 71 and 72, and also opens the circuit to the solenoid coils thereby assuring against accidental closure of valves 42 and 43. Thus, whenever rocket engine 10 functions in a proper manner the safety control mechanism becomes inoperative, but when combustion fails to take place within a preselected time interval the associated control circuit prevents further flow of propellants into the combustion chamber.

An indicating signal or jettison control device 93 can be connected in parallel with solenoid coils 75 and 76 for the purpose of providing either a signal indicative of failure of the engine to ignite properly or a signal to actuate suitable mechanism to jettison the rocket engine from a launching aircraft.

In Figure 2 there is illustrated a second form of control mechanism employing the principles of the present invention. In this embodiment rocket engine 10 is provided with an ignition burner 100 in which combustion initially takes place. Ignition burner 100 is supplied with fuel through a conduit 101 communicating with tank 14 and with oxidant through a conduit 102 communicating with tank 16. Conduits 101 and 102 contain respective solenoid operated valves 103 and 104 which are actuated by respective coils 106 and 107 connected in series arrangement with coil 60 and current source 65 through switch 66. Closure of switch 66 serves to open valves 32, 103 and 104 to pass both fuel and oxidant into ignition burner 100. Conduits 101, 102 and valves 103, 104 are of size such that the flow of fuel and oxidant into burner 100 is at a considerably lower rate than the flow of fuel and oxidant needed to propel the rocket engine. This initial flow rate of fuel and oxidant is sufficient to cause combustion in burner 100 but is not sufficient to create a hazardous accumulation of unburned fuel should combustion fail to take in the normal manner.

The main flow of fuel and oxidant into engine 10 takes place through conduits 110 and 111 communicating between respective tanks 14, 16 and engine 10. Solenoid operated valves 113 and 114 are disposed in respective conduits 110 and 111. These valves are actuated by respective coils 116 and 117 which are connected in circuit with current source 65 through switch 66 and a switch 118 which normally remains in an open position. Once combustion has taken place in burner 100 the electrical signal generated by flame detecting device 28, also disposed in burner 100, serves to energize solenoid coil 91, thereby closing switch 118 which is actuated by the armature of coil 91. Closure of switch 118 results in energizing current being passed through coils 116 and 117, thereby opening valves 113 and 114 to pass the main flow of fuel and oxidant into engine 10.

Warning signal or jettison control mechanism also is provided to indicate failure of combustion taking place in burner 100 after a preselected time interval following closure of switch 66. To this end a motor 68 which drives a rotatable drum 70 having a contact strip 73 thereon is connected across current source 65 through switch 66 and a switch 120, the latter being normally closed in the absence of energizing current being applied to coil 91. Thus closure of switch 66 starts operation of motor 68 which normally results in strip 73 completing contact between brushes 71 and 72. As soon as contact is made between brushes 71 and 72 a circuit is completed from battery 65 through switch 66 and a switch 121 to the signal or jettison device 93. However, once combustion takes place within burner 100, switches 120 and 121 both are opened by solenoid coil 91, thereby breaking the circuits to motor 68 and signal device 93 such that no signal is obtained.

In Figure 3 there is illustrated a third embodiment of the control mechanism of this invention. The fuel and oxidant inlet conduits 15 and 17 enter engine 10 in the same manner as illustrated in Figure 1. Conduits 15 and 17, however, each are provided with single respective valves 125 and 126. Valves 125 and 126 are of like construction and are provided with respective valve plugs 127 and 128, each of which contains first valve ports 130 and 131 and second valve ports 132 and 133, respectively. Valve ports 130 and 131 are considerably smaller in diameter than valve ports 132 and 133. Thus, at a first corresponding position of both valves relatively small quantities of propellants pass through conduits 15 and 17, and at a second corresponding position of the valves larger quantities of propellants pass through conduits 15 and 17. Valve plugs 127 and 128 are adapted to be rotated like amounts by worm gears 135 and 136, the latter gears being mounted on a common shaft 137 which is driven by motor 139. A drum 140 also is mounted on drive shaft 137.

Drum 140 is provided with a first pair of brushes 141 and 142 together with an electrical contact strip 144 which is adapted to make electrical contact between brushes 141 and 142 at a preselected rotational position of drum 140. Drum 140 also is provided with a second pair of brushes 145 and 146 together with an electrical contact strip 148 which is adapted to make electrical connection between brushes 145 and 146. Motor 139 is connected across current source 65 through one of two circuit paths, the first being through switch 66 and brushes 141, 142, and the second path being through switch 66, brushes 146, 145 and a switch 150 which is operated by solenoid coil 91.

Closure of switch 66 applies energizing current to solenoid coil 60 thereby opening valve 32 to transmit pressure from tank 35 to tanks 14 and 16. Closure of switch 66 also completes a circuit path from current source 65 to motor 68 through brushes 141, 142 which causes motor 139 to rotate to a first position such that valve ports 130 and 131 are aligned with respective conduits 15 and 17. Contact strip 144 is positioned on drum 140 such that contact between brushes 141 and 142 is broken when ports 130 and 131 are in alignment with their respective conduits. At this position small quantities of fuel and oxidant are allowed to enter the combustion chamber of engine 10 which should result in combustion taking place therein if the system is operating properly.

Contact strips 144 and 148 are positioned with respect to one another such that contact is completed between brushes 145 and 146 when valves 125 and 126 are opened to the initial flow position. However, the circuit path from current source 65 through motor 139 is not completed at this initial flow position because switch 150 remains in its normally open position. The presence of flame in the region of detecting element 28, however, serves to generate an electrical signal which energizes solenoid coil 91 to close switch 150. Closure of switch 150 results in motor 139 again operating to turn valve plugs 127 and 128 to a second position wherein ports 132 and 133 are aligned with respective conduits 15 and 17. At this second flow position rotation of motor 139 once again is stopped because contact strip 148 is rotated beyond brush 146 and no longer completes contact between brushes 145 and 146. Consequently, in the apparatus illustrated in Figure 3, the fuel and oxidant conduits first are opened by a small amount to pass fuel and oxidant into the combustion chamber of engine 10. Until combustion takes place these valves are not opened any further, but when combustion does take place the detection of the resulting flame by element 28 causes valves 127 and 128 to be opened to a second position to pass the main flow of propellants into the engine.

If desired, a second motor 68 and associated signal or jettison device 93 can be added to the control mechanism of Figure 3 in exactly the same manner as illustrated in Figure 2.

A second form of flame detector element 28' is illustrated in Figure 5. Detector 28' comprises a metallic casing 150 having a metallic electrode 151 positioned therein and electrically insulated from casing 150 by suitable insulating supports such as 152. Electrode 151 is embedded in a tip 154 of ceramic material positioned across one end of casing 150 and making electrical contact therewith. Ceramic tip 154 preferably is constructed of a refractory material such as aluminum oxide, which is formed as a paste by mixing powdered aluminum oxide with water. The paste is moulded in the form of a tip around casing 150 and then sintered, tip 154 being secured by holes 155 in casing 150. Leads 84' and 85' connect electrode 151 and casing 150, respectively, to amplifier 86. A voltage is generated between leads 84' and 85' by a flame impinging upon tip 154 and casing 150. Tip 154 is a semi-conductor and completes the circuit path between electrode 151 and casing 150. This phenomenon is described in greater detail in application Serial No. 220,116, filed April 9, 1951. It is to be understood that detector 28' can be employed in the various control systems of Figures 1, 2 and 3 in place of detector 28. Furthermore, any of the detecting elements described in said application Serial No. 220,116, filed April 9, 1951, can be employed in place of detector 28 in like manner.

From the foregoing description it should thus be apparent that there is provided in accordance with this invention rocket engine control mechanism utilizing a flame detecting element which is adapted to give almost instantaneous response to the presence of flame. While this invention has been described in conjunction with present preferred embodiments thereof, it should be apparent that various modifications can be made in the apparatus illustrated. The illustrated rocket engine is of the self-cooled or regenerative type. However, this is provided merely for purposes of explanation; the invention is in no way limited to any particular form of rocket engine. For certain applications it is advantageous to feed the propellants into the rocket engine by means of a pump system in place of the pressure system herein described. The principles of control described herein can, however, be employed in such a pump fuel system equally well. In those rocket motors wherein hypergolic fuels are employed the spark plug and associated spark coil can be dispensed with. Otherwise the operation is the same as described. Because these and other modifications can readily be made by those skilled in the art it is apparent that it is my intention not to be limited to the exact embodiments herein described.

Having described my invention, I claim:

1. In a starting system for a rocket engine including a combustion chamber, a source of fuel, a source of oxidant, and valve conduit means for supplying said fuel and said oxidant to said combustion chamber; the improvement comprising, in combination, first valve control means for passing said fuel and said oxidant to said combustion chamber, a flame detecting device positioned within said chamber, second valve control means for interrupting the flow of at least one of the fuel and oxidant streams into said combustion chamber at a preselected time interval following initial passage of the fuel and oxidant into said combustion chamber, and means responsive to said flame detecting device to render said second valve control means inoperative at such time as flame is detected in said combustion chamber by flame impinging directly on said device.

2. The combination in accordance with claim 1 wherein said flame detecting device comprises a pair of spaced electrodes at least one of which is positioned within said combustion chamber, and alternating current amplifying means applied across said electrodes to amplify voltage fluctuations between said electrodes generated by flame impinging upon at least one of said electrodes.

3. The combination in accordance with claim 2 wherein said rocket engine is adapted to be launched from an aircraft, further comprising release mechanism to jettison said rocket engine from the aircraft carrying said engine should combustion not be detected by said flame detecting device within said preselected time interval, and means under control of said second valve control means for actuating said release mechanism.

4. In a starting system for a rocket engine including a combustion chamber, a source of fuel, a source of oxidant, and valved conduit means for supplying said fuel and said oxidant to said combustion chamber; the improvement comprising, in combination, valve control means for passing said fuel and said oxidant into said combustion chamber at a first preselected rate, a flame detecting device positioned in said chamber, and means responsive to the detection of flame by said flame detecting device for adjusting said valve control means to pass said fuel and said oxidant into said combustion chamber at a second preselected rate, said second rate being greater than said first rate.

5. The combination in accordance with claim 4 wherein said flame detecting device comprises a pair of spaced electrodes at least one of which is positioned within said combustion chamber, and alternating current amplifying means applied across said electrodes to amplify voltage fluctuations between said electrodes generated by flame impinging upon at least one of said electrodes.

6. The combination in accordance with claim 5 wherein said rocket engine is adapted to be launched from an aircraft, further comprising release mechanism to jettison said rocket engine from the aircraft carrying said engine should combustion not be detected by said flame detecting device within said preselected time interval, and means under control of said second valve control means for actuating said release mechanism.

7. In a starting system for a rocket engine including a combustion chamber, a source of fuel, a source of oxidant, first and second valved conduit means for passing said fuel to said combustion chamber, third and fourth valved conduit means for passing said oxidant to said combustion chamber, said first and third conduit means being adapted to pass said respective fuel and oxidant at a first rate which is less than the rate said fuel and oxidant are passed by said respective second and fourth conduit means; the improvement comprising, in combination, first valve control means for passing said fuel and said oxidant to said combustion chamber through said first and third conduit means, a flame detecting device positioned in said chamber, and second valve control means under control of said flame detecting device for passing said fuel and said oxidant to said combustion chamber through said second and fourth conduit means when flame is detected by said flame detecting device.

8. The combination in accordance with claim 7 wherein said flame detecting device comprises a pair of spaced electrodes at least one of which is positioned within said combustion chamber, and alternating current amplifying means applied across said electrodes to amplify voltage fluctuations between said electrodes generated by flame impinging upon at least one of said electrodes.

9. The combination in accordance with claim 8 wherein said rocket engine is adapted to be launched from an aircraft, further comprising release mechanism to jettison said rocket engine from the aircraft carrying said engine should combustion not be detected by said flame detecting device within said preselected time interval, and means under control of said second valve control means for actuating said release mechanism.

10. In a starting system for a rocket engine including a combustion chamber, a source of fuel, a source of oxidant, and valved conduit means for supplying said fuel and said oxidant to said combustion chamber; the improvement comprising, in combination, first valve control means for passing said fuel and said oxidant to said combustion chamber, a flame detecting device positioned in said chamber, said flame detecting device comprising a pair of spaced electrodes at least one of which is positioned within said combustion chamber, and alternating current amplifying means applied across said electrodes to amplify voltage fluctuations between said electrodes generated by flame impinging upon at least one of said electrodes, a flowmeter disposed in one of said conduit means, timing means actuated by said flowmeter when a preselected flow rate is detected thereby, second valve control means for interrupting the flow of at least one of the fuel and oxidant streams into said combustion chamber at a preselected time interval following actuation of said timing means, said second valve control means being under control of said timing means, and means responsive to the output signal from said flame detecting element to render said second valve control means inoperative at such time as flame is detected by said flame detecting element.

11. The combination in accordance with claim 10 wherein said timing means comprises a rotatable drum having an electrically conductive element disposed on the periphery thereof, a pair of electrical brushes disposed adjacent the periphery of said drum such that rotation of said drum completes electrical contact between said brushes through said conductive element, and a motor coupled to said drum for rotating said drum.

12. In a starting system for a rocket engine including a combustion chamber, a fuel tank, an oxidant tank, a first conduit communicating between said fuel tank and said combustion chamber, a second conduit communicating between said oxidant tank and said combustion chamber, a source of fluid pressure, conduit means for applying said source of fluid pressure to said fuel and oxidant tanks, and valve means disposed in said conduit means for regulating the pressure applied to said fuel and oxidant tanks; the improvement comprising, in combination, first and second valves disposed in said first conduit, third and fourth valves disposed in said second conduit, said second and fourth valves being initially open, switching means for opening said valve means and said first and third valves to establish flow of fuel and oxidant to said combustion chamber, a flame detecting device positioned in said chamber, said flow detecting device comprising a pair of spaced electrodes at least one of which is positioned within said combustion chamber, and alternating current amplifying means applied across said electrodes to amplify voltage fluctuations between said electrodes generated by flame impinging upon at least one of said electrodes, an orifice plate disposed in one of said first and second conduits, a rotatable drum having an electrically conductive element disposed on the periphery thereof, a pair of electrical brushes disposed adjacent the periphery of said drum such that rotation of said drum completes electrical contact between said brushes through said conductive element, a motor coupled to said drum, switching means for applying energizing current to said motor when a preselected pressure differential exists across said orifice plate, means for closing said second and fourth valves when said conductive element makes contact between said pair of brushes, and means responsive to the output signal from said flame detecting element for rendering said second and fourth valve closing means inoperative when flame is detected in said combustion chamber prior to said conductive element completing contact between said brushes.

13. The combination in accordance with claim 12 wherein said rocket engine is adapted to be launched from an aircraft, further comprising a device to jettison said rocket engine from the aircraft carrying said engine should combustion not be detected by said flame detecting element before said conductive element completes contact between said brushes, and circuit means actuated by said last mentioned means for actuating said device.

14. In a starting system for a rocket engine including a combustion chamber, a source of fuel, a source of oxidant, and valved conduit means for supplying said fuel and said oxidant to said combustion chamber; the improvement comprising, in combination, a flame detecting device positioned in said chamber, said flame detecting device comprising a pair of spaced electrodes at least one of which is positioned within said combustion chamber, and alternating current amplifying means applied across said electrodes to amplify voltage fluctuations between said electrodes generated by flame impinging upon at least one of said electrodes, a rotatable drum having first and second electrically conductive elements disposed on the periphery thereof, a first pair of electrical brushes disposed adjacent the periphery of said drum such that rotation of said drum completes electrical contact between said first pair of brushes, a second pair of electrical brushes disposed adjacent the periphery of said drum such that further rotation of said drum completes contact between said second pair of brushes, a motor coupled to said drum for rotating said drum, said motor also operating said valved conduit means, circuit means completed through said first pair of brushes and said first conductive element for rotating said motor such as to pass said fuel and oxidant to said combustion chamber at a first preselected rate, and circuit means completed through said second pair of brushes and said second conductive element for rotating said motor such as to pass said fuel and oxidant to said combustion chamber at a second preselected rate, said last mentioned circuit means being completed by switch means responsive to the output signal from said flame detecting element.

15. In a starting system for a rocket engine including a combustion chamber, a fuel tank, an oxidant tank, a first conduit communicating between said fuel tank and said combustion chamber, a second conduit communicating between said oxidant tank and said combustion chamber, a source of fluid pressure, conduit means for applying said source of fluid pressure to said fuel and oxidant tanks, and valve means disposed in said conduit means for regulating the pressure applied to said fuel and oxidant tanks; the improvement comprising, in combination, a flame detecting device positioned in said chamber, said flame detecting device comprising a pair of spaced electrodes at least one of which is positioned within said combustion chamber, and alternating current amplifying means applied across said electrodes to amplify voltage fluctuations between said electrodes generated by flame impinging upon at least one of said electrodes, a first valve disposed in said first conduit, a second valve disposed in said second conduit, a motor adapted to position said first and second valves, said first and second valves each having corresponding first ports therethrough and corresponding second ports therethrough, said second ports being of larger cross-sectional area than corresponding said first ports, a rotatable drum having first and second electrically conductive elements disposed on the periphery thereof, a first pair of electrical brushes disposed adjacent the periphery of said drum such that rotation of said drum completes electrical contact between said first pair of brushes, a second pair of electrical brushes disposed adjacent the periphery of said drum such that further rotation of said drum completes contact between said second pair of brushes, said drum being rotated by said motor, circuit means completed through said first pair of brushes and said first conductive element for rotating said motor such as to pass said fuel and oxidant to said combustion chamber at a first preselected rate, and circuit means completed through said second pair of brushes and said second conductive element for rotating said motor such as to pass said fuel and oxidant to said combustion chamber at a second preselected rate, said last mentioned circuit means being completed by switch means responsive to the output signal from said flame detecting element.

16. In a rocket engine adapted to be launched from an aircraft, a starting system comprising, in combination, a source of fuel, a source of oxidant, valved conduit means for supplying said fuel and said oxidant to said combustion chamber, first valve control means for passing said fuel and said oxidant to said combustion chamber, release mechanism to jettison said rocket engine from the aircraft, and means to actuate said release mechanism to jettison said rocket engine at a preselected time interval following initial passage of said fuel and oxidant to said combustion chamber.

17. In a rocket engine adapted to be launched from an aircraft, a starting system comprising, in combination, a source of fuel, a source of oxidant, valved conduit means for supplying said fuel and said oxidant to said combustion chamber, valve control means for passing said fuel and said oxidant to said combustion chamber, a flame detecting device positioned in said chamber, said flame detecting device comprising a pair of spaced electrodes, at least one of which is positioned within said combustion chamber, and alternating current amplifying means applied across said electrodes to amplify voltage fluctuations between said electrodes generated by flame impinging upon at least one of said electrodes, a rotatable drum having an electrically conductive element disposed on the periphery thereof, a pair of electrical brushes disposed adjacent the periphery of said drum such that rotation of said drum completes electrical contact between said brushes through said conductive element, a motor coupled to said drum for rotating said drum, means for energizing said motor at the time fuel and oxidant are passed initially into said combustion chamber, circuit means completed through said brushes and said conductive element to actuate release mechanism to jettison said rocket engine, and means actuated by the output signal from said flame detecting element to render said last mentioned circuit means inoperative.

References Cited in the file of this patent

UNITED STATES PATENTS

| | | |
|---|---|---|
| 2,127,445 | Hardgrove | Aug. 16, 1938 |
| 2,323,767 | Hammond | July 6, 1943 |
| 2,440,405 | Johnson | Apr. 27, 1948 |
| 2,538,642 | Gardiner et al. | Jan. 16, 1951 |
| 2,631,426 | Jewett | Mar. 17, 1953 |